United States Patent
Li et al.

(10) Patent No.: US 11,440,565 B2
(45) Date of Patent: Sep. 13, 2022

(54) DECISION METHOD, DEVICE, EQUIPMENT IN A LANE CHANGING PROCESS AND STORAGE MEDIUM

(71) Applicant: Baidu Online Network Technology (Beijing) Co., Ltd., Beijing (CN)

(72) Inventors: Hongye Li, Beijing (CN); Kuan Zhang, Beijing (CN); Huaizhu Tang, Beijing (CN); Dayang Hao, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 162 days.

(21) Appl. No.: 16/790,324

(22) Filed: Feb. 13, 2020

(65) Prior Publication Data

US 2020/0262448 A1   Aug. 20, 2020

(30) Foreign Application Priority Data

Feb. 19, 2019   (CN) ......................... 201910123953.X

(51) Int. Cl.
*B60W 60/00* (2020.01)
*B60W 30/095* (2012.01)
(Continued)

(52) U.S. Cl.
CPC .... *B60W 60/0015* (2020.02); *B60W 30/0956* (2013.01); *B60W 30/18163* (2013.01);
(Continued)

(58) Field of Classification Search
None
See application file for complete search history.

(56) References Cited

U.S. PATENT DOCUMENTS 10,564,643 B2 * 2/2020 Lui .................. G05D 1/0219
11,040,729 B2 * 6/2021 Zhao ................ G01C 21/3658
(Continued)

FOREIGN PATENT DOCUMENTS

CN   105015545 A   11/2015
CN   105730443 A   7/2016
(Continued)

OTHER PUBLICATIONS

Iberraken et al., "Safe Autonomous Overtaking Maneuver based on Inter-Vehicular Distance Prediction and Multi-Level Bayesian Decision-Making", 2018 21st International Conference on Intelligent Transportation Systems (ITSC), Maui, Hawaii, USA, Nov. 4-7, 2018, p. 3259-3265 (Year: 2018).*

(Continued)

*Primary Examiner* — Tamara L Weber
(74) *Attorney, Agent, or Firm* — Benesch, Friedlander, Coplan & Aronoff LLP

(57) ABSTRACT

A decision method, device, equipment in a lane changing process and storage medium are provided. The method includes: acquiring a first planned track of a driverless vehicle for travelling to a first lane and a second planned track of the driverless vehicle for travelling to a second lane within a preset time period, in a lane changing process of the driverless vehicle; predicting a predicted track of at least one obstacle within the preset time period according to a travelling state of the obstacle, wherein the obstacle is in a preset range around the driverless vehicle; and determining a travelling motion of the driverless vehicle according to the first planned track, the second planned track and the predicted track of the obstacle.

16 Claims, 9 Drawing Sheets

(51) Int. Cl.
B60W 30/18 (2012.01)
G05D 1/02 (2020.01)
G05D 1/00 (2006.01)

(52) U.S. Cl.
CPC ... G05D 1/0214 (2013.01); *B60W 2554/4041* (2020.02); *G05D 1/0088* (2013.01); *G05D 2201/0213* (2013.01)

(56) References Cited

U.S. PATENT DOCUMENTS

| | | | |
|---|---|---|---|
| 11,077,845 B2* | 8/2021 | Shalev-Shwartz | G01S 13/931 |
| 2010/0228419 A1 | 9/2010 | Lee et al. | |
| 2017/0031361 A1 | 2/2017 | Olson et al. | |
| 2017/0320500 A1* | 11/2017 | Yoo | B60W 30/18163 |
| 2018/0043886 A1 | 2/2018 | Keller et al. | |
| 2018/0059670 A1 | 3/2018 | Nilsson | |
| 2019/0061765 A1* | 2/2019 | Marden | G05D 1/0214 |
| 2019/0071093 A1* | 3/2019 | Ma | G08G 1/167 |
| 2020/0156631 A1* | 5/2020 | Lin | G05D 1/0255 |

FOREIGN PATENT DOCUMENTS

| | | |
|---|---|---|
| CN | 107672587 A | 2/2018 |
| CN | 108313054 A | 7/2018 |
| CN | 108875998 A | 11/2018 |
| CN | 108919795 A | 11/2018 |
| EP | 1990788 B1 | 9/2012 |
| JP | 2015058890 A | 3/2015 |
| JP | 2017065420 A | 4/2017 |
| JP | 2020045039 A | 3/2020 |
| KR | 20180070376 A | 6/2018 |
| WO | 2018/131298 A1 | 7/2018 |
| WO | 2018147872 A1 | 8/2018 |

OTHER PUBLICATIONS

Extended European Search Report in European Patent Application No. 20158138.6, dated Jul. 24, 2020 (8 pages).

Notice of Reasons for Refusal issued by the Japanese Patent Office in Japanese Patent Application No. 2020-022654, dated Mar. 26, 2021 (5 pages).

Notification of Reason for Refusal issued by the Korean Patent Office in Korean Application No. 10-2020-0019616, dated Apr. 1, 2021 (15 pages).

Search Report issued by Registered Search Organization in Japanese Patent Application No. 2020-022654, dated Mar. 24, 2021 (40 pages).

First Office Action issued by China National Intellectual Property Administration in Chinese patent application No. 201910123953X, dated Jun. 16, 2021 (10 pages).

Search Report issued by China National Intellectual Property Administration in Chinese patent application No. 201910123953X, dated Jun. 4, 2021 (6 pages).

* cited by examiner

DECISION METHOD, DEVICE, EQUIPMENT IN A LANE CHANGING PROCESS AND STORAGE MEDIUM

CROSS-REFERENCE TO RELATED APPLICATION

This application claims priority to Chinese Patent Application No. 201910123953.X, entitled "DECISION METHOD, DEVICE, EQUIPMENT IN A LANE CHANGING PROCESS AND STORAGE MEDIUM", and filed on Feb. 19, 2019, which is hereby incorporated by reference in its entirety.

TECHNICAL FIELD

The disclosure relates to the technical field of driverless vehicles, and more particularly to a decision method, device, equipment in a lane changing process and storage medium.

BACKGROUND

A process that a vehicle travels from a lane to another lane in a travelling process is called lane changing. In a conventional art, a driverless vehicle may not respond to such an emergency in a lane changing process.

SUMMARY

A decision method and device in a lane changing process are provided according to the embodiments of the disclosure, to at least solve the above technical problem in the conventional art.

According to a first aspect, a decision method in a lane changing process is provided according to the embodiments of the disclosure, the method may include:

acquiring a first planned track of a driverless vehicle for travelling to a first lane and a second planned track of the driverless vehicle for travelling to a second lane within a preset time period, in a lane changing process of the driverless vehicle, wherein the first lane is a target lane of the lane changing process, and the second lane is a lane where the driverless vehicle is located at a starting moment of the lane changing process;

predicting a predicted track of at least one obstacle within the preset time period according to a travelling state of the obstacle, wherein the obstacle is in a preset range around the driverless vehicle; and determining a travelling motion of the driverless vehicle according to the first planned track, the second planned track and the predicted track of the obstacle.

In an implementation anode, determining the travelling motion of the driverless vehicle according to the first planned track, the second planned track and the predicted track of obstacle may include:

determining whether the travelling of the driverless vehicle on the first planned track is safe, according to the first planned track and the predicted track of each obstacle;

controlling the driverless vehicle to travel to the first lane, if the travelling of the driverless vehicle on the first planned track is safe; and if the travelling of the driverless vehicle on the first planned track is not safe, determining whether the travelling of the driverless vehicle on the second planned track is safe according to the second planned track and the predicted track of each obstacle; controlling the driverless vehicle to travel to the second lane if the travelling of the driverless vehicle on the second planned track is safe, and controlling the driverless vehicle to stop travelling if the travelling of the driverless vehicle on the second planned track is not safe.

In an implementation mode, determining whether the travelling of the driverless vehicle to the first lane is safe according to the first planned track and the predicted track of the obstacle may include:

determining a first predicted position of the driverless vehicle and a predicted position of the obstacle at least one time point in a preset time period, according to the first planned track and the predicted track of the obstacle;

for each time point in the preset time period, calculating a distance between the first predicted position and the predicted position; and determining whether a time point exists at which the distance is less than a first distance threshold, and determining that the travelling of the driverless vehicle to the first lane is not safe if the time point exists.

In an implementation mode, determining whether the travelling of the driverless vehicle to the second lane is safe according to the second planned track and the predicted track of each obstacle may include:

determining a second predicted position of the driverless vehicle and a predicted position of the obstacle at least one time point in a preset time period, according to the second planned track and the predicted track of the obstacle;

for each time point in the preset time period, calculating a distance between the second predicted position and the predicted position; and determining whether a time point exists at which the distance is less than a second distance threshold, and determining that the travelling of the driverless vehicle to the second lane is not safe if the time point exists.

In an implementation mode, the determining whether the travelling of the driverless vehicle to the second lane is safe according to the second planned track and the predicted track of the obstacle may further include:

determining whether the second planned track passes a section where lane changing is not allowed, and determining that the travelling of the driverless vehicle to the second lane is not safe if the section where the lane changing is not allowed is passed.

In an implementation mode, steps of acquiring, predicting and determining are repeatedly executed in the lane changing process.

According to a second aspect, a decision device in a lane changing process is provided according to the embodiments of the disclosure, which may include:

an acquisition module, configured to acquire a first planned track of a driverless vehicle for travelling to a first lane and a second planned track of the driverless vehicle for travelling to a second lane within a preset time period, in a lane changing process of the driverless vehicle, wherein the first lane is a target lane of the lane changing process, and the second lane is a lane where the driverless vehicle is located at a starting moment of the lane changing process;

a prediction module, configured to predict a predicted track of at least one obstacle within the preset time period according to a travelling state of the obstacle, wherein the obstacle is in a preset range around the driverless vehicle; and a decision module, configured to determine a travelling motion of the driverless vehicle according to the first planned track, the second planned track and the predicted track of the obstacle.

In an implementation mode, the decision module includes:

a first decision submodule, configured to determine whether a travelling of the driverless vehicle to the first lane is safe, according to the first planned track and the predicted track of the obstacle, determine to proceed the lane changing process if the travelling of the driverless vehicle to the first lane is safe, and instruct the second decision submodule for determination if the travelling of the driverless vehicle to the first lane is not safe; and a second decision submodule, configured to determine whether the travelling of the driverless vehicle to the second lane is safe according to the second planned track and the predicted track of the obstacle; determine to travel to the second lane if the travelling of the driverless vehicle to the second lane is safe, and determining to stop travelling if the travelling of the driverless vehicle to the second lane is not safe.

In an implementation mode, the first decision submodule may be configured to:

determine a first predicted position of the driverless vehicle and a predicted position of the obstacle at least one time point in a preset time period, according to the first planned track and the predicted track of the obstacle;

for each time point in the preset time period, calculate a distance between the first predicted position and the predicted position; and determine whether a time point exists at which the distance is less than a first distance threshold, and determine that the travelling of the driverless vehicle to the first lane is not safe if the time point exists.

In an implementation mode, the second decision submodule may be configured to:

determine a second predicted position of the driverless vehicle and a predicted position of the obstacle at least one time point in a preset time period, according to the second planned track and the predicted track of the obstacle;

for each time point in the preset time period, calculate a distance between the second predicted position and the predicted position; and determine whether a time point exists at which the distance is less than a second distance threshold, and determine that the travelling of the driverless vehicle to the second lane is not safe if the time point exists.

In an implementation mode, the second decision submodule may further be configured to:

determine whether the second planned track passes a section where lane changing is not allowed, and determining that the travelling of the driverless vehicle to the second lane is not safe if the section where the lane changing is not allowed is passed.

According to a third aspect, a decision equipment in a lane changing process is provided according to the embodiments of the present disclosure. A function of the equipment may be realized through hardware, and may also be realized by executing corresponding software through the hardware. The hardware or the software includes one or more modules corresponding to the function.

In a possible embodiment, a structure of the equipment includes a processor and a memory. The memory is configured to store a program supporting the server to execute the travelling motion determination method. The processor is configured to execute the program stored in the memory. The equipment may further include a communication interface, configured for communication with another device or communication network.

According to a fourth aspect, a computer-readable storage medium is provided according to the embodiments of the present disclosure, which is configured to store a computer software instruction for decision-making equipment for a lane changing process, including a program involved in execution of the decision-making method for the lane changing process.

One technical solution in the technical solutions has the following advantages or beneficial effects.

According to the embodiments of the disclosure, a first planned track of a driverless vehicle for travelling to a first lane and a second planned track of the driverless vehicle for travelling to a second lane, within a preset time period in a lane changing process of the driverless vehicle, and the predicted track of the obstacle around is calculated. Then, the determination on the travelling operation of the driverless vehicle is made according to such information. With adoption of the manner disclosed in the embodiments of the disclosure, a response may be made to an emergency on a road in the lane changing process of the driverless vehicle.

The summary is only for the purpose of description and not intended to form limits in any manner. Besides the above-described schematic aspects, implementation modes and characteristics, further aspects, implementation modes and characteristics of the disclosure become easy to understand with reference to the drawings and the following detailed descriptions.

BRIEF DESCRIPTION OF THE DRAWINGS

In the drawings, unless otherwise specified, the same reference signs throughout multiple drawings represent the same or similar components or elements. These drawings are not always drawn to scale. It is to be understood that these drawings only show some implementation modes disclosed according to the disclosure and should not be considered as limits to the scope of the disclosure.

DETAILED DESCRIPTION

Some exemplary embodiments are simply described below only. As realized by those skilled in the art, the described embodiments may be modified in various manners without departing from the spirit or scope of the disclosure. Therefore, the drawings and the descriptions are considered to be substantially exemplary and nonrestrictive.

A driverless vehicle, before lane changing, determines whether a target lane is safe according to the planned track and a travelling track of an obstacle on the target lane and executes lane changing if it is safe. However, a travelling condition of an obstacle around may change in a lane changing process, for example, a vehicle behind on the target lane suddenly accelerates or a vehicle in front suddenly decelerates, and this makes the lane changing process of the driverless vehicle unsafe.

A decision method and device in a lane changing process are provided according to the embodiments of the disclosure. Detailed descriptions will be made to the technical solutions below through the following embodiments respectively.

Figure 1:
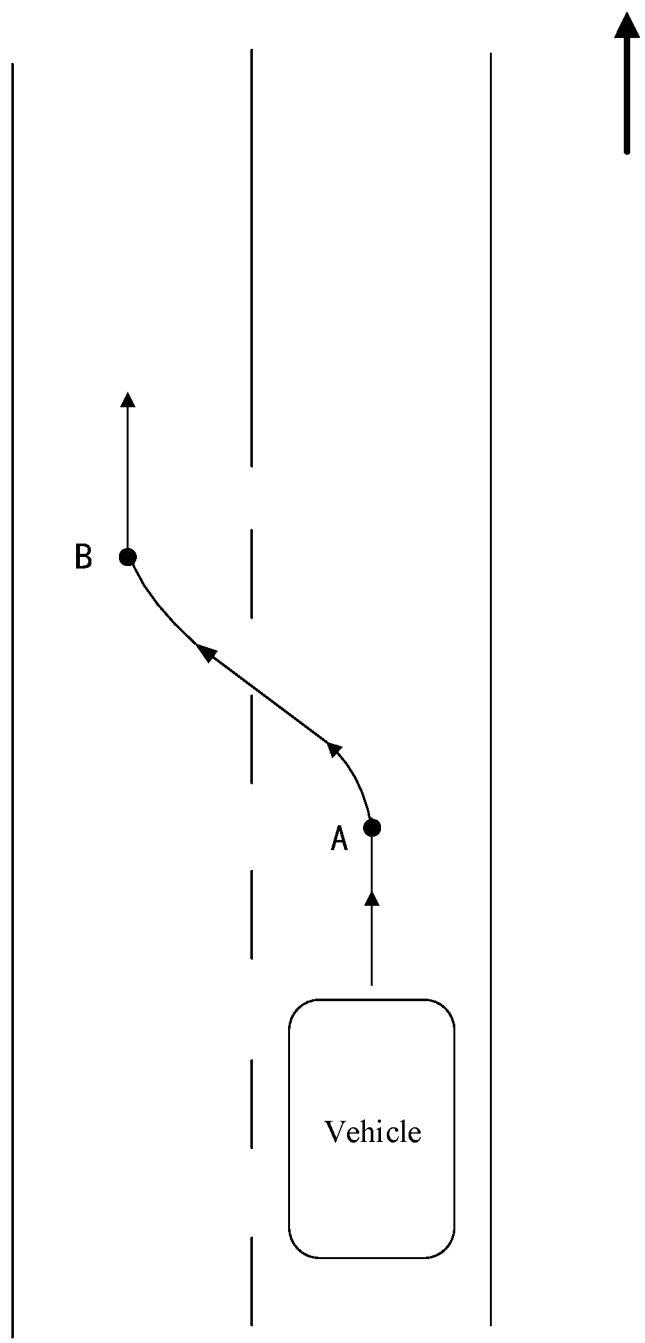
FIG. 1 is a schematic diagram of a lane changing process of a vehicle.

The decision method in a lane changing process of the embodiments of the disclosure may be applied to a driverless vehicle. FIG. 1 is a schematic diagram of a lane changing process of a vehicle. A section of a road with double lanes is presented in FIG. 1, and a travelling direction on the road is an upward direction in Figures. The vehicle in FIG. 1 travels on the right lane before lane changing and travels on the left lane after lane changing. The arrowed line in the figure represents the lane changing process of the vehicle and a travelling route before and after lane changing. In the travelling route, the part from point A to point B is a route in the lane changing process. The embodiments of the disclosure may be applied to a travelling process of the driverless vehicle along the route from point A to point B.

Figure 2:
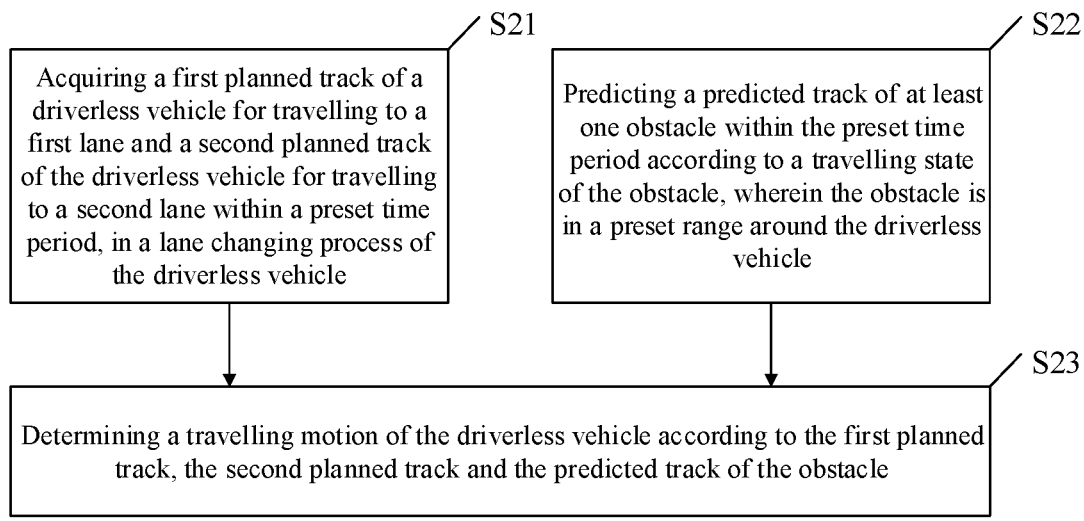
FIG. 2 is an implementation flowchart of a decision method in a lane changing process according to an embodiment of the disclosure.

FIG. 2 is an implementation flowchart of a decision method in a lane changing process according to an embodiment of the disclosure. The following steps are included.

In S21, acquiring a first planned track of a driverless vehicle for travelling to a first lane and a second planned track of the driverless vehicle for travelling to a second lane within a preset time period.

The first lane may be a target lane of the lane changing process, i.e., a lane planned for the driverless vehicle before lane changing.

The second lane may be a lane where the driverless vehicle is located at a starting moment of the lane changing process, i.e., a lane before lane changing.

The preset time period may be a time period of a preset time length starting from a present moment.

In S22, predicting a predicted track of at least one obstacle within the preset time period according to a travelling state of the obstacle, wherein the obstacle is in a preset range around the driverless vehicle.

In S23, determining a travelling motion of the driverless vehicle according to the first planned track, the second planned track and the predicted track of the obstacle.

An execution sequence of S21 and S22 is not limited, any step may be executed at first, or they may be executed at the same time.

In a possible implementation mode, S21 to S23 may be repeatedly executed according to a preset rule in the lane changing process of the driverless vehicle, for example, executed according to a preset period.

In S22, the first planned track and second planned track of the driverless vehicle may include information such as planned positions, planned velocities and planned accelerations of the driverless vehicle at multiple time points within the preset time period.

In S22, the obstacle in the preset range around the driverless vehicle may be an obstacle in a sensing range of the driverless vehicle and may also be an obstacle closest to the driverless vehicle on the first lane and the second lane. The travelling state of the obstacle may include information such as a position, a velocity, an acceleration and a direction. The predicted track of the obstacle may include information such as a predicted position, predicted velocity and predicted acceleration of the obstacle at each time point within the preset time period.

Figure 3:
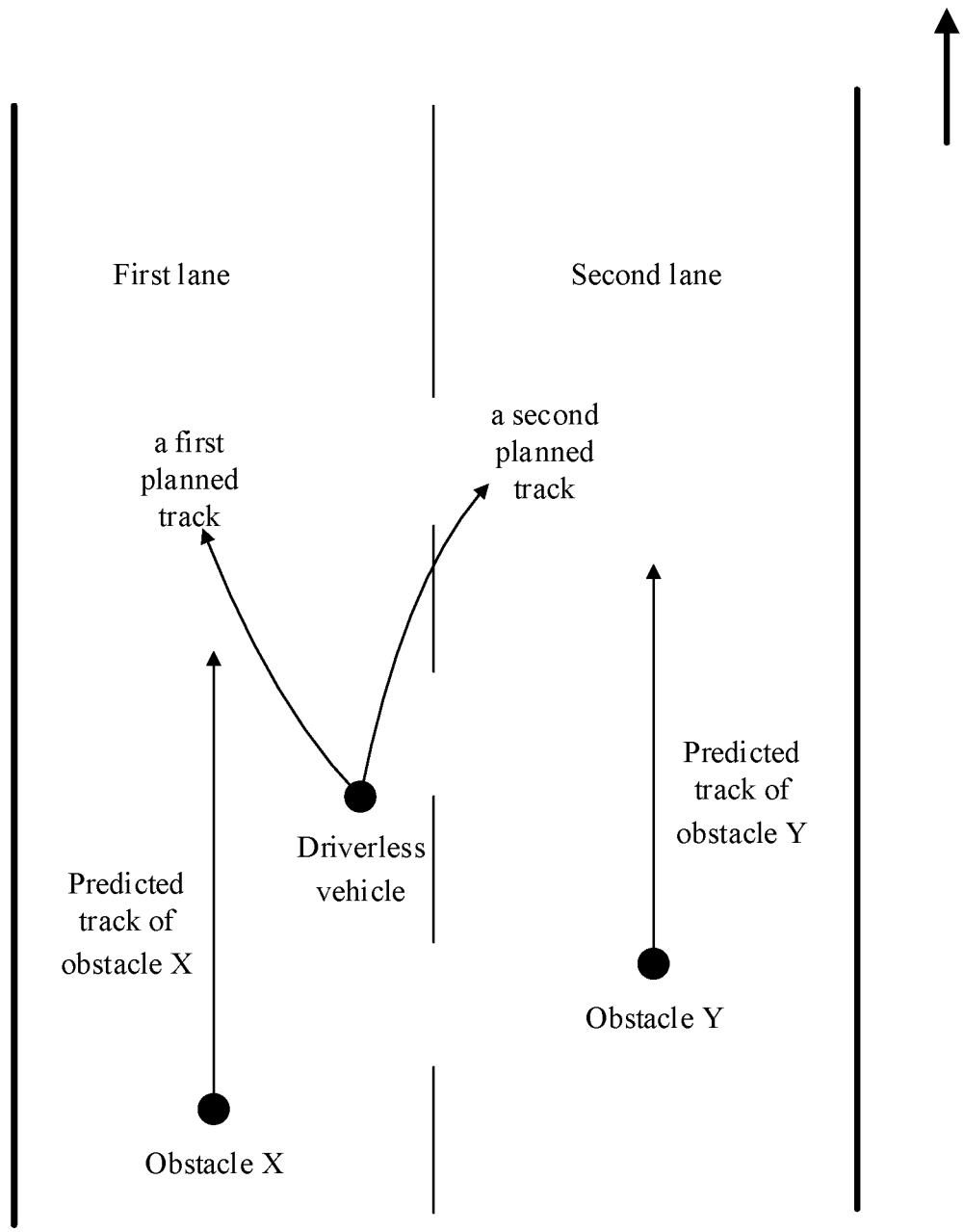
FIG. 3 is a schematic diagram of a first planned track and second planned track of a driverless vehicle and predicted track of the obstacle according to an embodiment of the disclosure.

FIG. 3 is a schematic diagram of a first planned track and second planned track of a driverless vehicle and a predicted track of each obstacle of obstacle according to an embodiment of the disclosure. A section of a road with double lanes is presented in FIG. 3, and a travelling direction on the road is an upward direction in the figure. For avoiding influence on presentation of each track, the black points in FIG. 3 represent the driverless vehicle and the obstacles, and the obstacles may be pedestrians, vehicles and the like.

As shown in FIG. 3, the driverless vehicle is located on the right lane (i.e., the second lane shown in FIG. 3) before lane changing and has just entered the left lane (i.e., the first lane shown in FIG. 3) and yet not completed the lane changing process at present. Two predicted tracks are simultaneously predicted at the position where the driverless vehicle is presented in FIG. 3. The first planned track is a track travelling to the first lane, namely continuing completing lane changing, and the second planned track is a track for travelling to the second lane, namely returning to the original lane.

In FIG. 3, there are two obstacles around the driverless vehicle. The obstacle X travels on the first lane, and the obstacle Y travels on the second lane. The tracks of the obstacle X and the obstacle Y within the preset time period may be predicted according to travelling states thereof.

Based on the above introductions about the first planned track, the second planned track and the predicted track of each obstacle, specific implementation modes of the embodiment of the disclosure will be introduced below.

Figure 4:
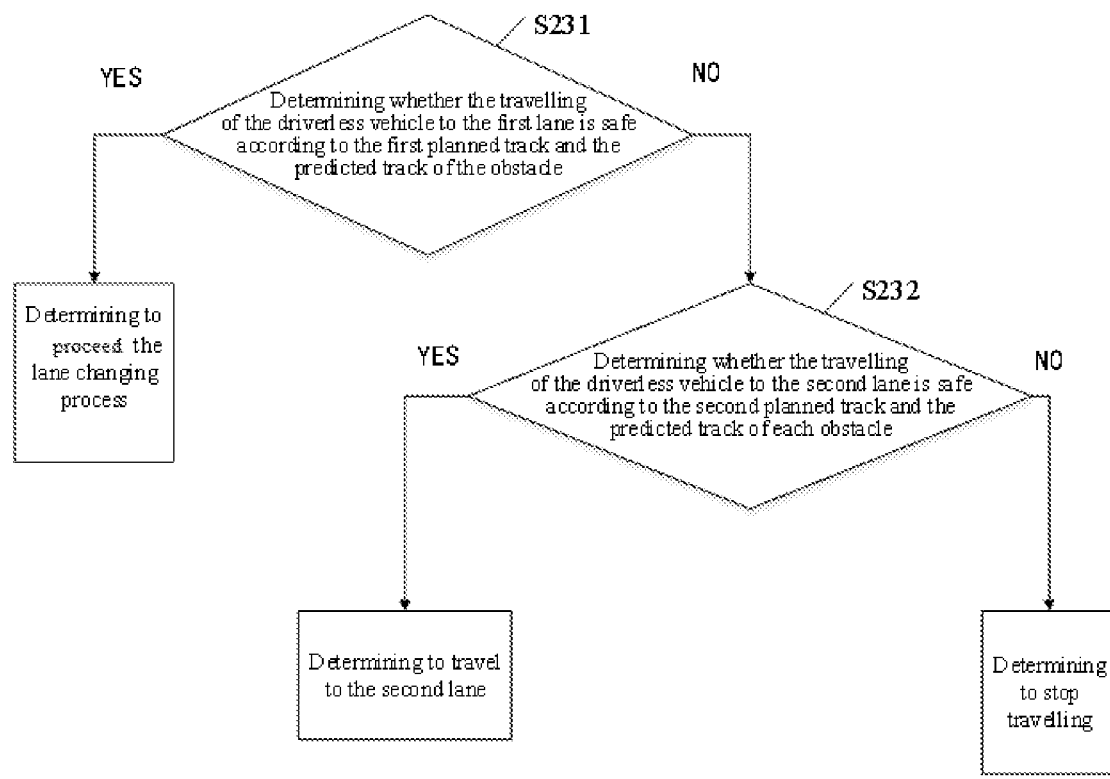
FIG. 4 is an implementation flowchart of S23 according to an embodiment of the disclosure.

FIG. 4 is an implementation flowchart of S23 according to an embodiment of the disclosure. The following steps are included.

In S231, determining whether a travelling of the driverless vehicle to the first lane is safe, according to the first planned track and the predicted track of the obstacle; determining to proceed the lane changing process if the travelling of the driverless vehicle to the first lane is safe, otherwise, executing S232.

In S232, if the travelling of the driverless vehicle to the first lane is not safe, determining whether the travelling of the driverless vehicle to the second lane is safe according to the second planned track and the predicted track of the obstacle; determining to travel to the second lane if the travelling of the driverless vehicle to the second lane is safe, and determining to stop travelling if the travelling of the driverless vehicle to the second lane is not safe.

The driverless vehicle, after stopping travelling, may travel to the first lane or the second lane again after a danger on the first lane or the second lane is eliminated. For example, the obstacle X or obstacle Y in FIG. 3 has travel to a position far away from the driverless vehicle.

Figure 5:
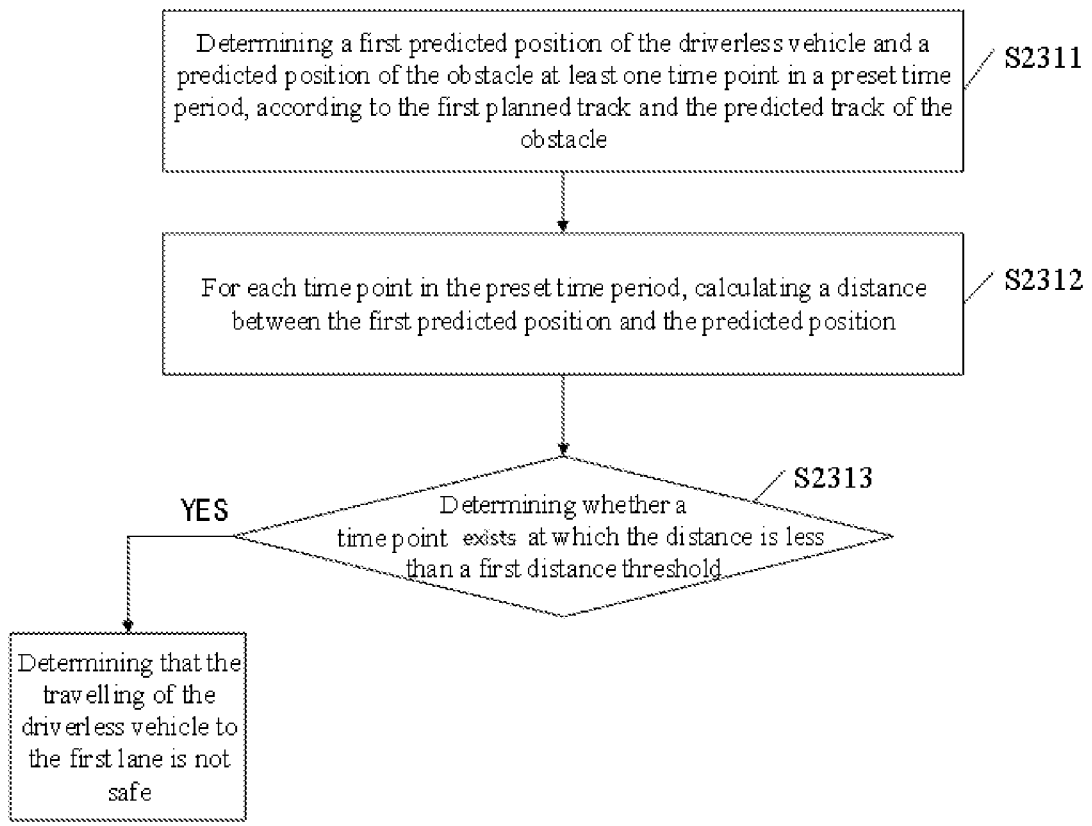
FIG. 5 is an implementation flowchart of S231 according to an embodiment of the disclosure.

In a possible implementation mode, as shown in FIG. 5, the determining whether the travelling of the driverless vehicle to the first lane is safe according to the first planned track and the predicted track of each obstacle in S231 may include:

In S2311, determining a first predicted position of the driverless vehicle and a predicted position of the obstacle at least one time point in a preset time period, according to the first planned track and the predicted track of the obstacle;

In S2312, for each time point in the preset time period, calculating a distance between the first predicted position and the predicted position;

In S2313, determining whether a time point exists at which the distance is less than a first distance threshold, and determining that the travelling of the driverless vehicle to the first lane is not safe if the time point exists.

Descriptions will be made below based on FIG. 3. At the present moment, the first planned track of the driverless vehicle and predicted track of the obstacle X within the preset time period are determined. In the embodiment, descriptions are made with the condition that the preset time period is next 8s as an example.

In S2311, a first predicted position of the driverless vehicle and predicted position of each obstacle in next 8s are determined according to the first planned track and the predicted track of the obstacle X. For example, every second is a determination moment, first predicted positions {Pa1, Pa2, Pa3, Pa4, Pa5, Pa6, Pa7, Pa8} of the driverless vehicle at eight moments in the next 8s are determined, and predicted positions {Px1, Px2, Px3, Px4, Px5, Px6, Px7, Px8} of the obstacle X at the corresponding eight moments are determined.

In S2312, for each moment, a distance between the first predicted position and each predicted position is calculated. Namely, for the first moment, the distance between Pa1 and Px1 is calculated;

for the second moment, the distance between Pa2 and Px2 is calculated;

... ; and for the eighth moment, the distance between Pa8 and Px8 is calculated.

In S2313, if any one of the calculated distance is less than the first preset distance threshold, it is determined that it is unsafe for the driverless vehicle to travel to the first lane. In a possible implementation mode, the first preset distance threshold may be set to be different values according to a condition such as a road type, a present road condition and a present vehicle velocity. For example, when the vehicle velocity is relatively high, the first distance threshold is set to be a relatively high value; and when the vehicle velocity is relatively low, the first distance threshold is set to be a relatively low value.

In the embodiment, descriptions are made with judgment in a distance between the driverless vehicle and an obstacle as an example. When distances between the driverless vehicle and at least two obstacles are determined, it may be determined that it is unsafe for the driverless vehicle to travel to the first lane if the distance between the first predicted position and a predicted position of any obstacle is less than the first preset distance threshold.

Figure 6:
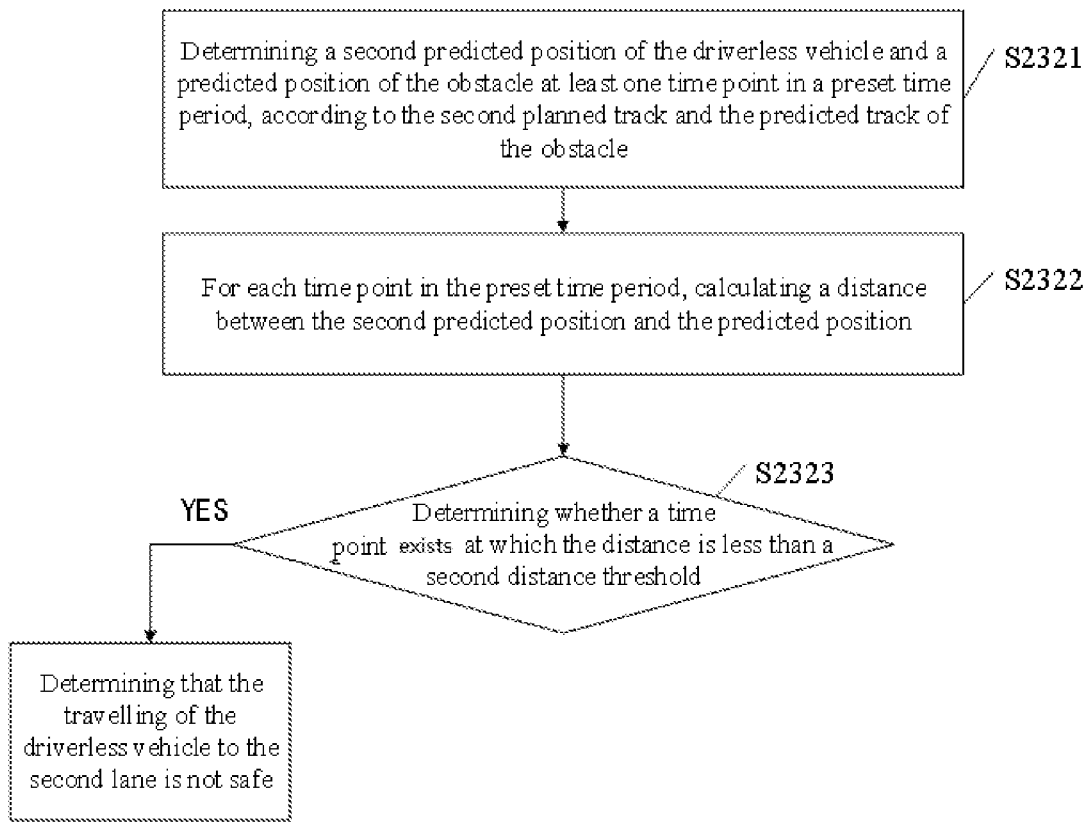
FIG. 6 is an implementation flowchart of S232 according to an embodiment of the disclosure.

In an implementation mode, as shown in FIG. 6, the determining whether the travelling of the driverless vehicle to the second lane is safe according to the second planned track and the predicted track of each obstacle in S232 may include:

in S2321, determining a second predicted position of the driverless vehicle and a predicted position of the obstacle at least one time point in a preset time period, according to the second planned track and the predicted track of the obstacle;

in S2322, for each time point in the preset time period, calculating a distance between the second predicted position and the predicted position; and in S2323, determining whether a time point exists at which the distance is less than a second distance threshold, and determining that the travelling of the driverless vehicle to the second lane is not safe if the time point exists.

Descriptions will be made below still based on FIG. 3. At the present moment, the second planned track of the driverless vehicle and predicted track of the obstacle Y within the preset time period are determined. In the embodiment, descriptions are made with the condition that the preset time period is next 8s as an example.

In S2321, a second predicted position of the driverless vehicle and predicted position of each obstacle in next 8s are determined according to the second planned track and the predicted track of the obstacle Y. For example, every second is a determination moment, second predicted positions {Pb1, Pb2, Pb3, Pb4, Pb5, Pb6, Pb7, Pb8} of the driverless vehicle at eight moments in the next 8s are determined, and predicted positions {Py1, Py2, Py3, Py4, Py5, Py6, Py7, Py8} of the obstacle Y at the corresponding eight moments are determined.

In S2322, for each moment, a distance between the second predicted position and each predicted position is calculated. Namely, for the first moment, the distance between Pb1 and Py1 is calculated;

for the second moment, the distance between Pb2 and Py2 is calculated;

... ; and for the eighth moment, the distance between Pb8 and Py8 is calculated.

In S2323, if any one of the calculated distance is less than the second preset distance threshold exists, it is determined that it is unsafe for the driverless vehicle to travel to the second lane. In a possible implementation mode, the second preset distance threshold may be set to be different values according to the road type, the present road condition and the present vehicle velocity. For example, when the vehicle velocity is relatively high, the second distance threshold is set to be a relatively high value; and when the vehicle velocity is relatively low, the second distance threshold is set to be a relatively low value.

It is to be noted that, in the embodiment, descriptions are made with determination in a distance between the driverless vehicle and an obstacle as an example. When distances between the driverless vehicle and at least two obstacles are determined, it may be determined that it is unsafe for the driverless vehicle to travel to the second lane if the distance between the second predicted position and a predicted position of any obstacle is less than the second preset distance threshold.

Safety in travelling of the driverless vehicle to the second lane is determined in the above process according to a collision risk. Considering the traffic rules, on the same road, lane changing is allowed in some sections and lane changing is not allowed in some sections. If a vehicle is located in a section where lane changing is allowed at the beginning of lane changing and then enters a section where lane changing is not allowed, there is also a danger when it changes the lane again.

Based on this, in another embodiment of the disclosure, the determining whether the travelling of the driverless vehicle to the second lane is safe according to the second planned track and the predicted track of the obstacle in S232 may further include that: determining whether the second planned track passes a section where lane changing is not allowed, and determining that the travelling of the driverless vehicle to the second lane is not safe if the section where the lane changing is not allowed is passed.

It is to be noted that a travelling motion determination process for a moment in the lane changing process of the driverless vehicle is introduced in the abovementioned embodiment. In the lane changing process of the driverless vehicle, the travelling motion determination process introduced in the abovementioned embodiment may be executed for many times until lane changing of the driverless vehicle is ended. For example, the travelling motion determination process is periodically executed according to a preset period in the lane changing process.

Figure 7:
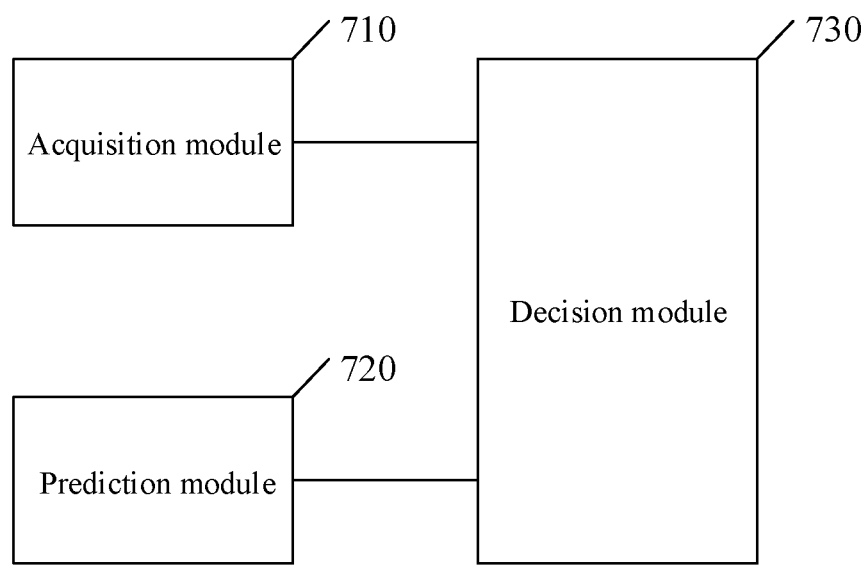
FIG. 7 is a structure diagram of a decision device in a lane changing process according to an embodiment of the disclosure.

An embodiment of the disclosure also discloses a decision device in a lane changing process. Referring to FIG. 7, FIG. 7 is a structure diagram of a decision device in a lane changing process according to an embodiment of the disclosure. The device includes an acquisition module 710, a prediction module 720 and a decision module 730.

The acquisition module 710 is configured to acquire a first planned track of a driverless vehicle for travelling to a first lane and a second planned track of the driverless vehicle for travelling to a second lane within a preset time period, in a lane changing process of the driverless vehicle, wherein the first lane is a target lane of the lane changing process, and the second lane is a lane where the driverless vehicle is located at a starting moment of the lane changing process.

The prediction module 720 is configured to predict a predicted track of at least one obstacle within the preset time period according to a travelling state of the obstacle, wherein the obstacle is in a preset range around the driverless vehicle.

The decision module 730 is configured to determine a travelling motion of the driverless vehicle according to the first planned track, the second planned track and the predicted track of the obstacle.

Figure 8:
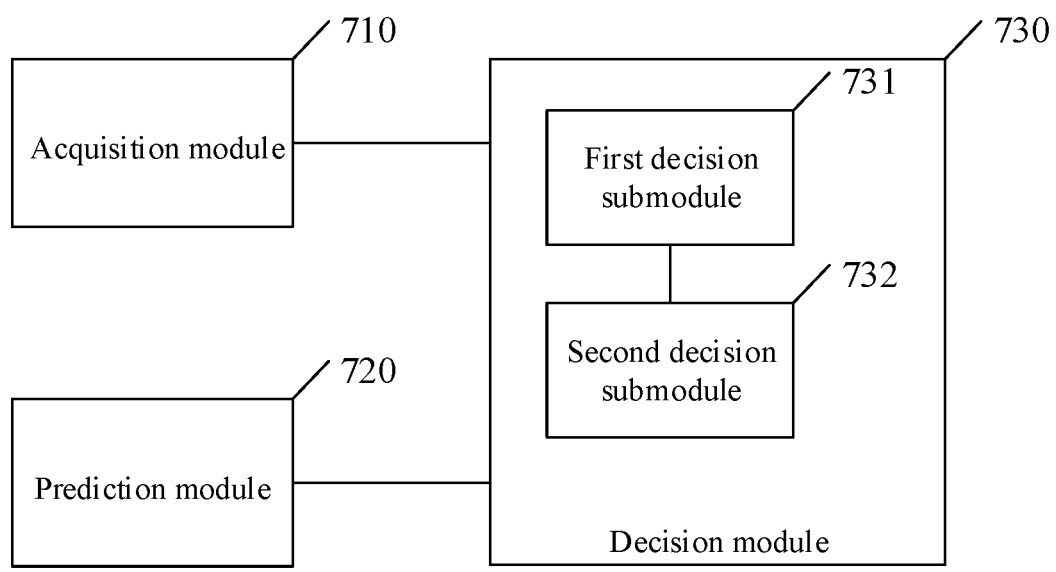
FIG. 8 is a structure diagram of a decision device in a lane changing process according to an embodiment of the disclosure.

As shown in FIG. 8, in an implementation mode, the decision module 730 includes a first decision submodule 731 and a second decision submodule 732.

The first decision submodule 731 is configured to determine whether a travelling of the driverless vehicle to the first lane is safe, according to the first planned track and the predicted track of the obstacle, determine to proceed the lane changing process if the travelling of the driverless vehicle to the first lane is safe, and instruct the second decision submodule 723 for determination if the travelling of the driverless vehicle on the first planned track is not safe.

The second decision submodule 732 is configured to determine determine whether the travelling of the driverless vehicle to the second lane is safe according to the second planned track and the predicted track of the obstacle; determine to travel to the second lane if the travelling of the driverless vehicle to the second lane is safe, and determining to stop travelling if the travelling of the driverless vehicle to the second lane is not safe.

In an implementation mode, the first decision submodule 731 is configured to:

determine a first predicted position of the driverless vehicle and a predicted position of the obstacle at least one time point in a preset time period, according to the first planned track and the predicted track of the obstacle;

for each time point in the preset time period, calculate a distance between the first predicted position and the predicted position; and determine whether a time point exists at which the distance is less than a first distance threshold, and determine that the travelling of the driverless vehicle to the first lane is not safe if the time point exists.

In an implementation mode, the second decision submodule 732 is configured to:

determine a second predicted position of the driverless vehicle and a predicted position of the obstacle at least one time point in a preset time period, according to the second planned track and the predicted track of the obstacle;

for each time point in the preset time period, calculate a distance between the second predicted position and the predicted position; and determine whether a time point exists at which the distance is less than a second distance threshold, and determine that the travelling of the driverless vehicle to the second lane is not safe if the time point exists.

In an implementation mode, the second decision submodule 732 is further configured to:

determine whether the second planned track passes a section where lane changing is not allowed, and determining that the travelling of the driverless vehicle to the second lane is not safe if the section where the lane changing is not allowed is passed.

The function of each module in each device of the embodiment of the disclosure may refer to the corresponding descriptions in the method and will not be elaborated herein.

Figure 9:
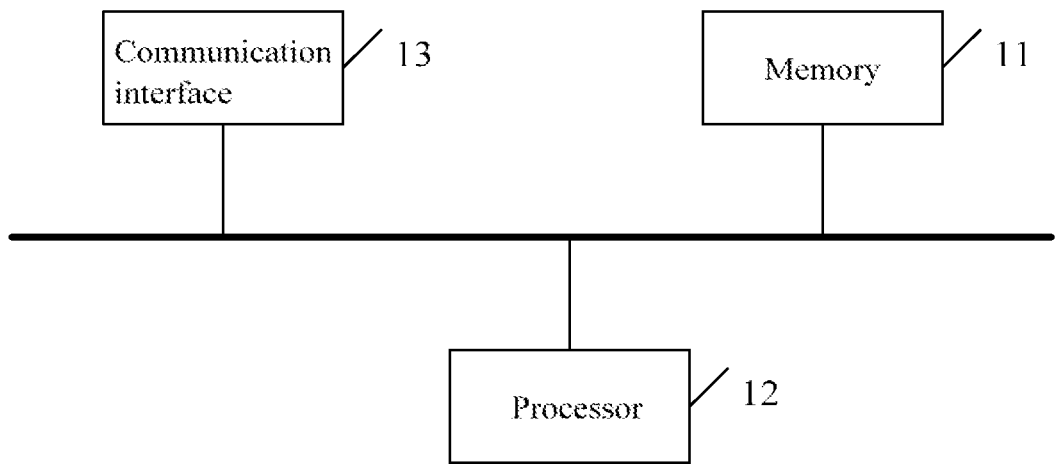
FIG. 9 is a structure diagram of a decision equipment in a lane changing process according to an embodiment of the disclosure.

An embodiment of the disclosure also discloses a decision equipment in a lane changing process. FIG. 9 is a structure diagram of a decision equipment in a lane changing process according to an embodiment of the disclosure. The equipment includes a memory 11 and a processor 12. The memory 11 stores a computer program capable of travelling in the processor 12. The processor 12 executes the computer program to implement the decision method in a lane changing process in the abovementioned embodiment. The numbers of the memory 11 and the processor 12 may be one or more.

The equipment may further include a communication interface 13.

The communication interface 13 is configured to communicate with an external device for data exchange transmission.

The memory 11 may include a high-speed Random Access Memory (RAM) and may also include a non-volatile memory, for example, at least one disk memory.

If the memory 11, the processor 12 and the communication interface 13 are independently implemented, the memory 11, the processor 12 and the communication interface 13 may be connected with one another and complete communication with one another through a bus. The bus may be an Industry Standard Architecture (ISA) bus, a Peripheral Component interconnect (PCI) bus or an Extended Industry Standard Architecture (EISA) bus, etc. The bus may be divided into an address bus, a data bus, a control bus and the like. For convenient representation, only one bold line is adopted for representation in FIG. 9, and it is not indicated that there is only one bus or one type of bus.

Optionally, during specific implementation, if the memory 11, the processor 12 and the communication interface 13 are integrated into a chip, the memory 11, the processor 12 and the communication interface 13 may complete communication with one another through an internal interface.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means two or more than two, unless otherwise limited definitely and specifically.

Any process or method in the flowcharts or described herein in another manner may be understood to represent a module, segment or part including codes of one or more executable instructions configured to realize specific logic functions or steps of the process and, moreover, the scope of the preferred implementation mode of the disclosure includes other implementation, not in a sequence shown or discussed herein, including execution of the functions basically simultaneously or in an opposite sequence according to the involved functions. This should be understood by those skilled in the art of the embodiments of the disclosure.

Logics and/or steps represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a RAM, a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It is to be understood that each part of the disclosure may be implemented by hardware, software, firmware or a combination thereof. In the abovementioned implementation modes, multiple steps or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the steps in the method of the abovementioned embodiment may be completed through related hardware instructed by a program, the program may be stored in a computer-readable storage medium, and when the program is executed, one or combination of the steps of the method embodiment is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium. The storage medium may be a ROM, a magnetic disk, an optical disk or the like.

Based on the above, according to the decision method and device in a lane changing process according to the embodiments of the disclosure, the first planned track of the driverless vehicle for travelling to the first lane and second planned track for travelling to the second lane in a period of time are acquired in the lane changing process of the driverless vehicle, and the predicted track of the obstacle around is calculated. Then, the determination of the travelling motion of the driverless vehicle is made according to the first planned track, the second planned track and the predicted track of each obstacle. With adoption of the manner disclosed in the embodiments of the disclosure, a response may be made to an emergency on a road in the lane changing process of the driverless vehicle.

The above is only the specific implementation mode of the disclosure and not intended to limit the scope of protection of the disclosure. Various variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A decision method in a lane changing process, implemented by circuits for implementing functions, comprising:
   acquiring a first planned track of a driverless vehicle for travelling to a first lane and a second planned track of the driverless vehicle for travelling to a second lane within a preset time period, in a lane changing process of the driverless vehicle, wherein the first lane is a target lane of the lane changing process, and the second lane is a lane where the driverless vehicle is located at a starting moment of the lane changing process;
   predicting a predicted track of at least one obstacle within the preset time period according to a travelling state of the obstacle, wherein the obstacle is in a preset range around the driverless vehicle; and
   determining a travelling motion of the driverless vehicle according to the first planned track, the second planned track and the predicted track of the obstacle,
   wherein determining the travelling motion of the driverless vehicle according to the first planned track, the second planned track and the predicted track of the obstacle, comprises:
   determining a first predicted position of the driverless vehicle and a predicted position of the obstacle at least one time point in a preset time period, according to the first planned track and the predicted track of the obstacle;

for each time point in the preset time period, calculating a distance between the first predicted position and the predicted position; and determining whether a time point exists at which the distance is less than a first distance threshold, and determining that the travelling of the driverless vehicle to the first lane is not safe if the time point exists, wherein the first distance threshold is set according to a condition including at least one of a road type, a present road condition or a present vehicle velocity.

2. The decision method of claim 1, wherein determining the travelling motion of the driverless vehicle according to the first planned track, the second planned track and the predicted track of the obstacle further comprises:

determining to proceed the lane changing process, if the travelling of the driverless vehicle to the first lane is safe; and if the travelling of the driverless vehicle to the first lane is not safe, determining whether the travelling of the driverless vehicle to the second lane is safe according to the second planned track and the predicted track of the obstacle; determining to travel to the second lane if the travelling of the driverless vehicle to the second lane is safe, and determining to stop travelling if the travelling of the driverless vehicle to the second lane is not safe.

3. The decision method of claim 2, wherein determining whether the travelling of the driverless vehicle to the second lane is safe according to the second planned track and the predicted track of each obstacle comprises:

determining a second predicted position of the driverless vehicle and a predicted position of the obstacle at least one time point in a preset time period, according to the second planned track and the predicted track of the obstacle;

for each time point in the preset time period, calculating a distance between the second predicted position and the predicted position; and determining whether a time point exists at which the distance is less than a second distance threshold, and determining that the travelling of the driverless vehicle to the second lane is not safe if the time point exists.

4. The decision method of claim 3, wherein determining whether the travelling of the driverless vehicle to the second lane is safe according to the second planned track and the predicted track of the obstacle further comprises:

determining whether the second planned track passes a section where lane changing is not allowed, and determining that the travelling of the driverless vehicle to the second lane is not safe if the section where the lane changing is not allowed is passed.

5. The decision method of claim 3, wherein steps of acquiring, predicting and determining are repeatedly executed in the lane changing process.

6. The decision method of claim 2, wherein steps of acquiring, predicting and determining are repeatedly executed in the lane changing process.

7. The decision method of claim 1, wherein steps of acquiring, predicting and determining are repeatedly executed in the lane changing process.

8. A decision device in a lane changing process, implemented by circuits for implementing functions, comprising:

one or more processors;

a storage device configured to store one or more programs;

wherein the one or more programs are executed by the one or more processors to enable the one or more processors to:

acquire a first planned track of a driverless vehicle for travelling to a first lane and a second planned track of the driverless vehicle for travelling to a second lane within a preset time period, in a lane changing process of the driverless vehicle, wherein the first lane is a target lane of the lane changing process, and the second lane is a lane where the driverless vehicle is located at a starting moment of the lane changing process;

predict a predicted track of at least one obstacle within the preset time period according to a travelling state of the obstacle, wherein the obstacle is in a preset range around the driverless vehicle; and determine a travelling motion of the driverless vehicle according to the first planned track, the second planned track and the predicted track of the obstacle, wherein to determine the travelling motion of the driverless vehicle according to the first planned track, the second planned track and the predicted track of the obstacle, the one or more programs are executed by the one or more processors to enable the one or more processors further to:

determine a first predicted position of the driverless vehicle and a predicted position of the obstacle at least one time point in a preset time period, according to the first planned track and the predicted track of the obstacle;

for each time point in the preset time period, calculate a distance between the first predicted position and the predicted position; and determine whether a time point exists at which the distance is less than a first distance threshold, and determine that the travelling of the driverless vehicle to the first lane is not safe if the time point exists, wherein the first distance threshold is set according to a condition including at least one of a road type, a present road condition or a present vehicle velocity.

9. The decision device of claim 8, wherein the one or more programs are executed by the one or more processors to enable the one or more processors further to:

determine to proceed the lane changing process if the travelling of the driverless vehicle to the first lane is safe; and if the travelling of the driverless vehicle to the first lane is not safe, determine whether the travelling of the driverless vehicle to the second lane is safe according to the second planned track and the predicted track of the obstacle; determine to travel to the second lane if the travelling of the driverless vehicle to the second lane is safe, and determining to stop travelling if the travelling of the driverless vehicle to the second lane is not safe.

10. The decision device of claim 9, wherein the one or more programs are executed by the one or more processors to enable the one or more processors to:

determine a second predicted position of the driverless vehicle and a predicted position of the obstacle at least one time point in a preset time period, according to the second planned track and the predicted track of the obstacle;

for each time point in the preset time period, calculate a distance between the second predicted position and the predicted position; and determine whether a time point exists at which the distance is less than a second distance threshold, and determine that the travelling of the driverless vehicle to the second lane is not safe if the time point exists.

11. The decision device of claim 10, wherein the one or more programs are executed by the one or more processors to enable the one or more processors to:
   determine whether the second planned track passes a section where lane changing is not allowed, and determine that the travelling of the driverless vehicle to the second lane is not safe if the section where the lane changing is not allowed is passed.

12. A non-volatile computer-readable storage medium, implemented by circuits for implementing functions, storing computer executable instructions stored thereon, that when executed by a processor cause the processor to perform operations comprising:
   acquiring a first planned track of a driverless vehicle for travelling to a first lane and a second planned track of the driverless vehicle for travelling to a second lane within a preset time period, in a lane changing process of the driverless vehicle, wherein the first lane is a target lane of the lane changing process, and the second lane is a lane where the driverless vehicle is located at a starting moment of the lane changing process;
   predicting a predicted track of at least one obstacle within the preset time period according to a travelling state of the obstacle, wherein the obstacle is in a preset range around the driverless vehicle; and
   determining a travelling motion of the driverless vehicle according to the first planned track, the second planned track and the predicted track of the obstacle,
   wherein determining the travelling motion of the driverless vehicle according to the first planned track, the second planned track and the predicted track of the obstacle, comprises:
   determining a first predicted position of the driverless vehicle and a predicted position of the obstacle at least one time point in a preset time period, according to the first planned track and the predicted track of the obstacle;
   for each time point in the preset time period, calculating a distance between the first predicted position and the predicted position; and
   determining whether a time point exists at which the distance is less than a first distance threshold, and determining that the travelling of the driverless vehicle to the first lane is not safe if the time point exists, wherein the first distance threshold is set according to a condition including at least one of a road type, a present road condition or a present vehicle velocity.

13. The non-volatile computer-readable storage medium of claim 12, wherein the computer executable instructions, when executed by a processor, cause the processor to perform further operations comprising:
   determining to proceed the lane changing process, if the travelling of the driverless vehicle to the first lane is safe; and
   if the travelling of the driverless vehicle to the first lane is not safe, determining whether the travelling of the driverless vehicle to the second lane is safe according to the second planned track and the predicted track of the obstacle; determining to travel to the second lane if the travelling of the driverless vehicle to the second lane is safe, and determining to stop travelling if the travelling of the driverless vehicle to the second lane is not safe.

14. The non-volatile computer-readable storage medium of claim 13, wherein the computer executable instructions, when executed by a processor, cause the processor to perform further operations comprising:
   determining a second predicted position of the driverless vehicle and a predicted position of the obstacle at least one time point in a preset time period, according to the second planned track and the predicted track of the obstacle;
   for each time point in the preset time period, calculating a distance between the second predicted position and the predicted position; and
   determining whether a time point exists at which the distance is less than a second distance threshold, and determining that the travelling of the driverless vehicle to the second lane is not safe if the time point exists.

15. The non-volatile computer-readable storage medium of claim 14, wherein the computer executable instructions, when executed by a processor, cause the processor to perform further operations comprising:
   determining whether the second planned track passes a section where lane changing is not allowed, and determining that the travelling of the driverless vehicle to the second lane is not safe if the section where the lane changing is not allowed is passed.

16. The non-volatile computer-readable storage medium of claim 12, wherein the computer executable instructions, when executed by a processor, cause the processor to perform further operations comprising:
   wherein steps of acquiring, predicting and determining are repeatedly executed in the lane changing process.

* * * * *